K. A. JOHNSON.
GRAIN SHOCKER FOR HARVESTERS.
APPLICATION FILED SEPT. 13, 1913. RENEWED JAN. 18, 1915.

1,144,848.

Patented June 29, 1915.
5 SHEETS—SHEET 1.

Witnesses:
Geo. Knutson
A. H. Opsahl

Inventor:
Karl A. Johnson
By his Attorneys:
Williamson & Merchant

Fig. 2.

K. A. JOHNSON.
GRAIN SHOCKER FOR HARVESTERS.
APPLICATION FILED SEPT. 13, 1913. RENEWED JAN. 18, 1915.

1,144,848.

Patented June 29, 1915.
5 SHEETS—SHEET 3.

Witnesses:
Geo. Knutson
A. H. Opsahl

Inventor:
Karl A. Johnson
By his Attorneys:
Williamson Merchant

K. A. JOHNSON.
GRAIN SHOCKER FOR HARVESTERS.
APPLICATION FILED SEPT. 13, 1913. RENEWED JAN. 18, 1915.

1,144,848.

Patented June 29, 1915.
5 SHEETS—SHEET 5.

Witnesses:
Geo. Knutson
A. H. Opsahl

Inventor
Karl A. Johnson
By his Attorneys
Williamson & Merchant

UNITED STATES PATENT OFFICE.

KARL A. JOHNSON, OF OLIVIA, MINNESOTA.

GRAIN-SHOCKER FOR HARVESTERS.

1,144,848.  Specification of Letters Patent.  Patented June 29, 1915.

Application filed September 13, 1913, Serial No. 789,690. Renewed January 18, 1915. Serial No. 2,979.

*To all whom it may concern:*

Be it known that I, KARL A. JOHNSON, a citizen of the United States, residing at Olivia, in the county of Renville and State of Minnesota, have invented certain new and useful Improvements in Grain-Shockers for Harvesters; and I do hereby declare the following to be a full, clear, and exact description of the invention, such as will enable others skilled in the art to which it appertains to make and use the same.

My invention has for its object to provide an improved shocker for use as an attachment to harvesters, to first collect the bundles in shocks and then to deposit the shocks onto the ground.

Generally stated, the invention consists of the novel devices and combinations of devices hereinafter described and defined in the claims.

In the accompanying drawings which illustrate the invention, like characters indicate like parts throughout the several views.

Referring to the drawings.

The harvester to which this shocker is attached may be of the usual or any suitable construction, and of the parts thereof, shown in the drawings, the numeral 1 indicates the harvester frame, the numeral 2 the traction wheel, 3 the pole, the numeral 4 a counter shaft driven from the wheel 2 through a sprocket and chain drive 5, the numeral 6 the binder deck, the numeral 7 the binder breast plate, the numeral 8 the binder discharge arms, and the numeral 9 the driver's seat.

Figure 1:
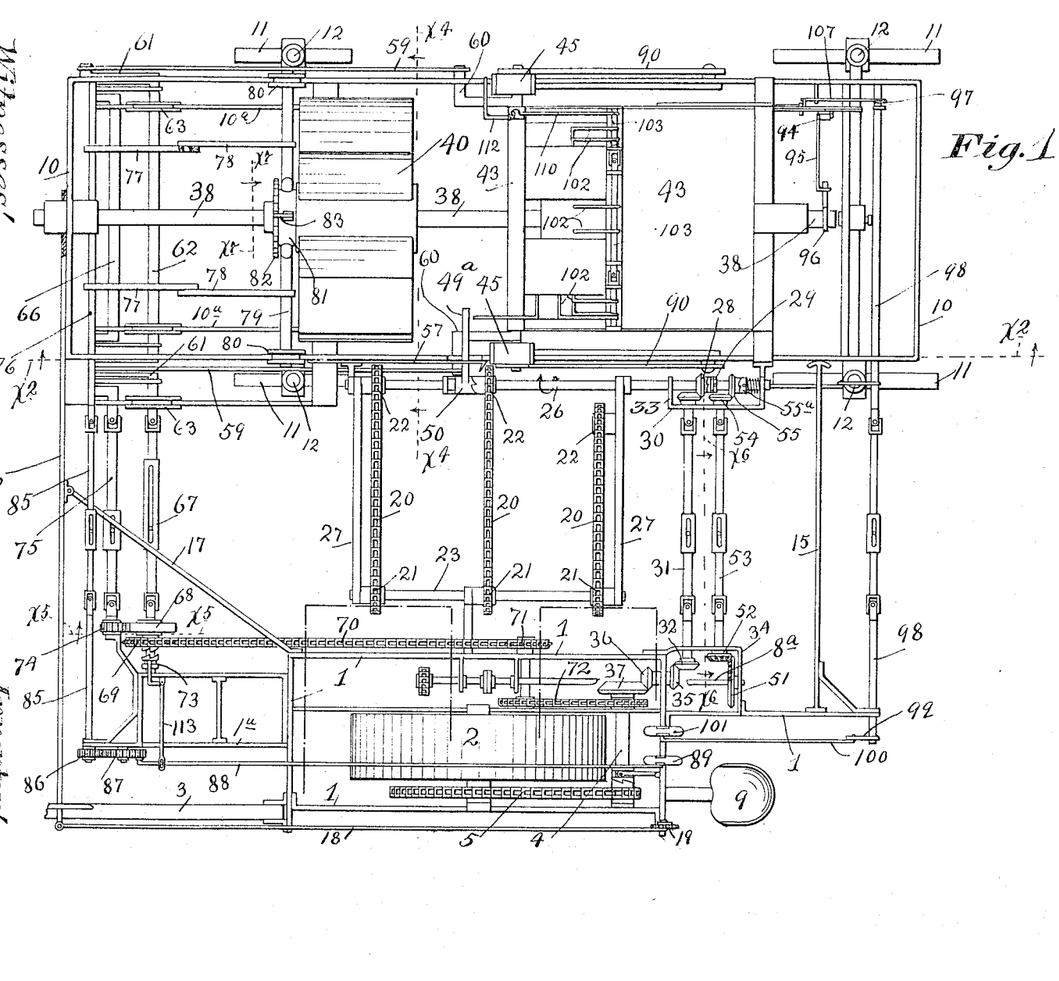
Figure 1 is a plan view showing some portions of a harvester and showing my improved shocker attached thereto, some parts being removed.

Most of the parts of the attachment are carried on an auxiliary truck made up of a frame 10 and suitable supporting wheels 11. The front and rear wheels 11 are journaled to wheel brackets 12 that are swiveled to bearings 13 which, in turn, are secured to the ends of horizontal beams 14, which latter are intermediately pivoted to the frame 10. The rear beam 14 (see particularly Fig. 3) is at such elevation that it will pass over a shock of grain set on the ground as indicated at $y$ in said Fig. 3. The rear inner portion of the truck frame 10 bears against the outer end of a spacing bar 15, the inner end of which is rigidly secured to the rear right hand portion of the harvester frame 1. The front end portion of the said truck frame 10 is attached to the right hand end of a heavy beam 16 that is intermediately pivoted to a thrust bar 17, rigidly secured to and projecting forward from the harvester frame 1. The inner end of the beam 16 is connected to the front end of a long link 18, the rear end of which (see particularly Fig. 1), is adjustably secured by a lever, or otherwise, to a lock segment or flange 19 secured on the harvester frame 1. It may be here stated, that by endwise adjustments of the link 18, the auxiliary truck frame 10 may be moved forward or rearward, so as to set the same to the exact adjustment for handling bundles bound from grain of different length. Also, the said beam 16 and link 18 afford means for causing the auxiliary truck to travel forward with the harvester.

The bound bundles which are delivered from the binder deck 6 by the binder discharge arms 8, are caught by an elevator belt, shown as in the form of spike-equipped chains 20 that run over sprockets 21 and 22. The sprockets 21 are all secured on a counter shaft 23 which, as shown, is journaled in the upper ends of supporting links 24, the lower ends of which are pivoted to brackets 25, rigidly secured on the right hand side or end of the harvester frame 1. The front and intermediate sprockets 22 are rigidly secured on a counter shaft 26 journaled in suitable bearings on the truck frame 10. Spacing bars 27 connect the two shafts 23 and 26, the said shafts being loosely journaled therein. The rear sprocket 22 is journaled to the rear spacing bar 27. The counter shaft 26 has a loose beveled pinion 28 that is adapted to be coupled thereto by an ordinary clutch 29. The beveled pinion 28 meshes with a beveled pinion 30 that is secured to the right hand end of an extensible shaft 31, the inner end of which is provided with a beveled pinion 32. The outer end of the shaft 31 is journaled in the bearing bracket 33 secured to the truck frame 10. The inner end of the said shaft 31 is journaled in a bearing bracket 34 secured to the harvester frame 1. The pinion 32 meshes with a beveled pinion 35. The pinion 35 is connected by a short shaft to a beveled pinion 36 that meshes with a beveled gear 37 which is on the inner end of the driven counter shaft 4.

The bundles received from the binder by the elevator belts 20 are delivered in succession to a so-called shock former which is made up of a rotary star wheel, a reel and a divided casing, the reel being inclosed in the casing. The star wheel and reel, presently to be described, are carried by different sections of a longitudinally extended shaft 38 which is made in two sections, the said sections being normally coupled together for common rotation by an automatic clutch 39, shown in Fig. 8. The front section of the shaft 38 is mounted for rotary and endwise movements in suitable bearings on the frame 10, and carries the star wheel 40 of the shock former. The rear section of the shaft 38 is journaled in a head 41 that is provided with diametrically projecting studs 42 (see Figs. 3, 8 and 12), that pivotally connect the two approximately semi-cylindrical sections 43 of the divided casing. The said casing, therefore, supports the said head 41. The lower case section, at its front edge portion is provided with laterally projecting trunnions 44 (see Figs. 2 and 3) that are journaled in traveling bearings 45 mounted to slide on rails 10$^a$, which rails are rigidly secured to or formed as parts of the truck frame 10. The divided casing is thus so mounted that it is free to travel on the rails 10$^a$ and is free to be turned upward into the vertical position shown in Fig. 3.

Working within the divided casing is a reel, which, as shown, is made up of a disk-like head 46 and reel blades 47. The reel blades 47, at their rear ends, are pivoted to the head 46 and their free ends are yieldingly thrown outward toward the inner surfaces of the case sections 43, by means of coiled springs 48 (see Figs. 3 and 12). The rear section of the shaft 38, between the reel blades 47, is preferably provided with an enlarged cylindrical portion or core 49 around which the bundles will be packed. Normally, the divided casing 43, the reel 46—47 and the star wheel 40 occupy positions shown in Figs. 1, 2 and 8, with the case sections open on their inner side far enough to permit the bundles to be delivered into the casing and between the blades of the reel, by the elevator chains 21. Here it may be noted (see Figs. 1 and 4), that the shaft 26 carries an arm 49$^a$, that assists in delivering the bundles from the elevator belts 21 to the divided casing and to the reel. This arm 49$^a$, as shown, is secured to a loose clutch sleeve 50 that is mounted to slide on the shaft 26. This clutch sleeve 50 will engage with a half clutch on the hub of the adjacent sprocket 22, to cause the sprocket chains 20 to be driven from the said shaft 26.

It is the intention to deposit one bound bundle in each compartment of the reel 46—47. To cause the elevator chains 20 to do this, they are given an intermittent movement from the main shaft 8$^a$ of the binder, which main shaft carries the discharge arms 8, already noted, (see Fig. 4). The extended end of this binder shaft 8$^a$ (see Fig. 1) carries a segmental beveled gear 51 that meshes with a beveled pinion 52 carried by the inner end of a jointed extensible shaft 53. This shaft 53 is journaled in suitable bearings on the bearing brackets 33—34, and at its outer end, has a small miter gear 54 that meshes with a companion miter gear 55 that is coupled to the shaft 26 by a one-way clutch 55$^a$.

Rotation of the shaft 38 and the reel and star wheel carried thereby, is produced by the engagement of the arms 49$^a$ (see Fig. 4), with the bundle in the last loaded compartment of the reel. The said reel will be rotated in the direction of the arrow marked adjacent thereto on Fig. 4.

Figure 2:
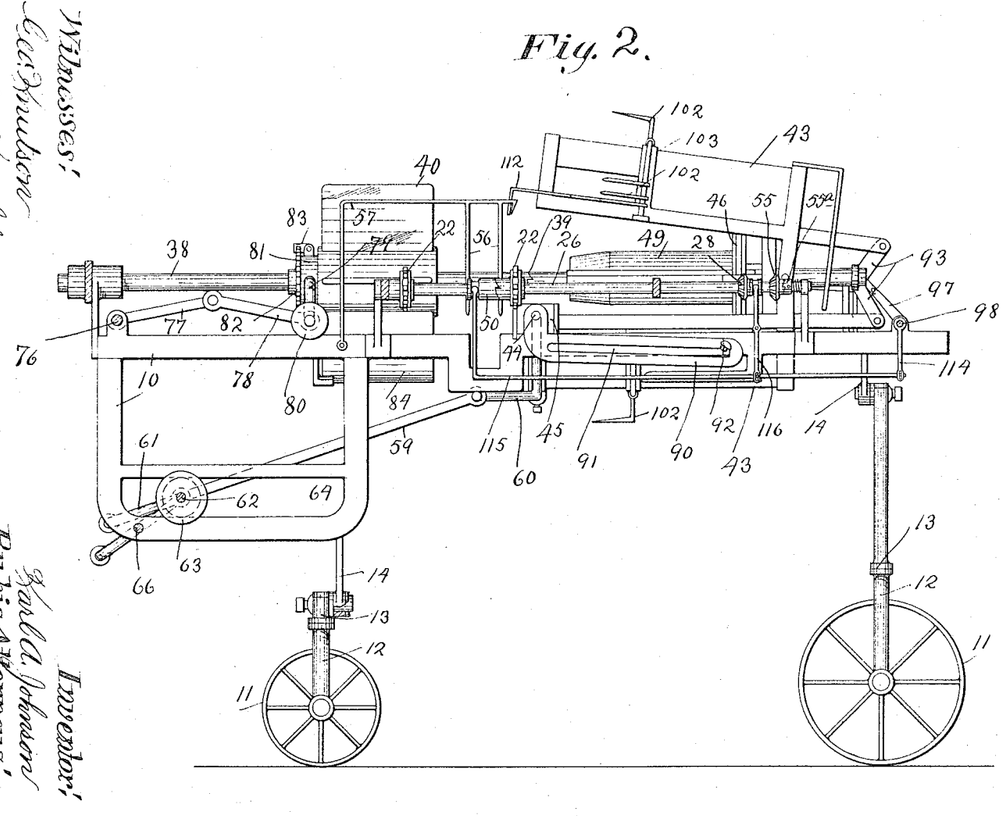
Fig. 2 is a vertical section taken on the line $x^2$ $x^2$ on Fig. 1.
Figure 3:
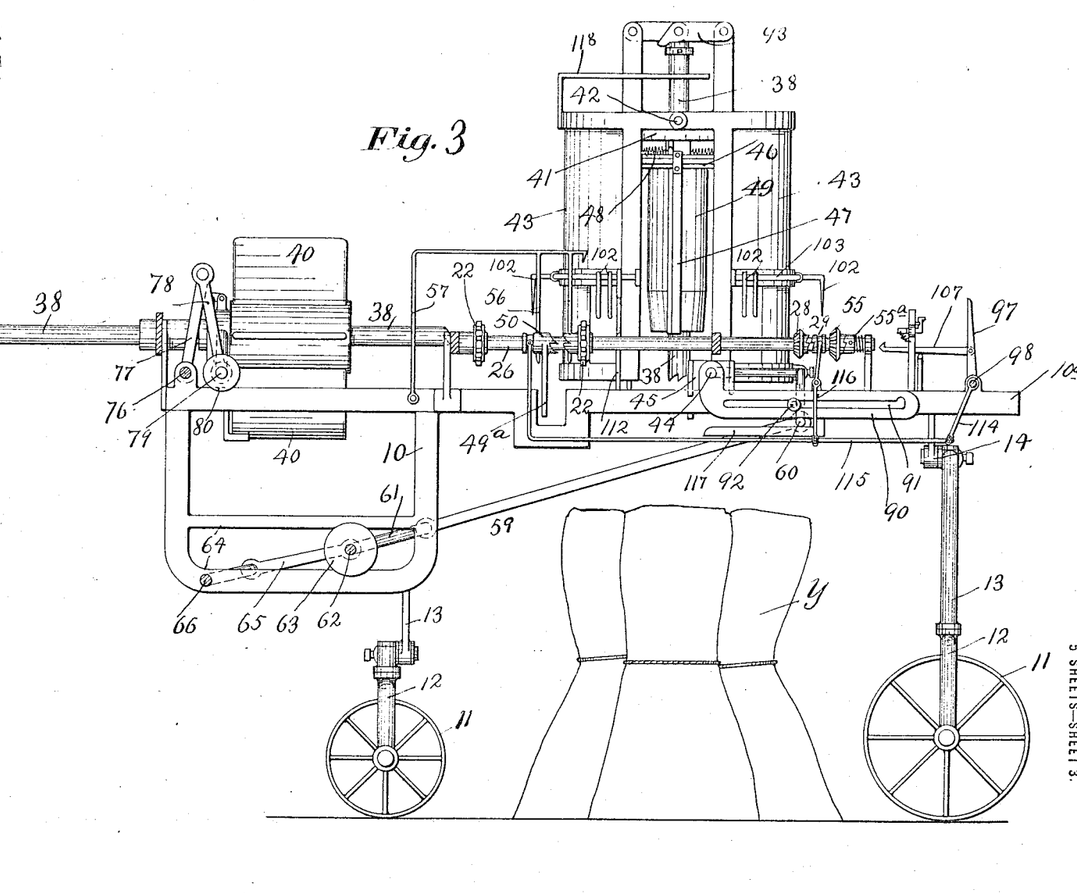
Fig. 3 is a section taken on the same line as Fig. 2, but illustrating different positions of the parts.
Figures 4, 5:
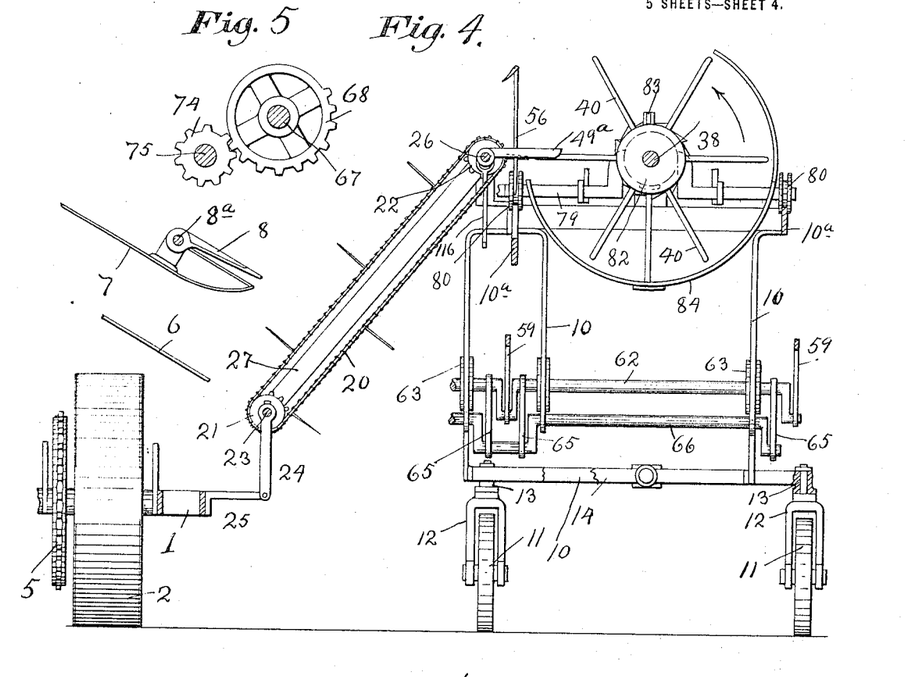
Fig. 4 is a transverse section taken approximately on the line $x^4$ $x^4$ on Fig. 1, some parts being removed and some parts being shown in diagram only.
Fig. 5 is a detail in section on the line $x^5$ $x^5$ on Fig. 1.

The bundles delivered from the elevator chains into the divided casing and to the reel, are forced under the depending prongs 56 of the spring rod 57, which, at one end, is rigidly secured to the frame 10, (see Figs. 2 and 3). The spring prongs 56 produce a downward pressure on the bundles which properly delivers them into the alined compartment of the reel.

Figure 8:
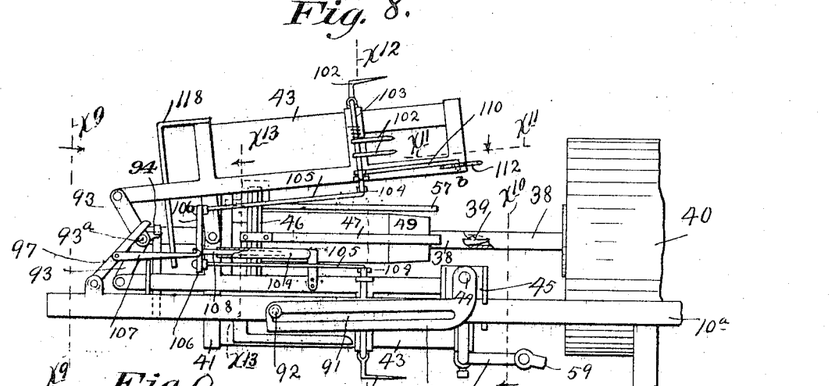
Fig. 8 is a view in elevation of certain parts best shown in Fig. 2, looking at the same from the right hand side of the machine.
Figures 9, 10, 11, 12, 13:
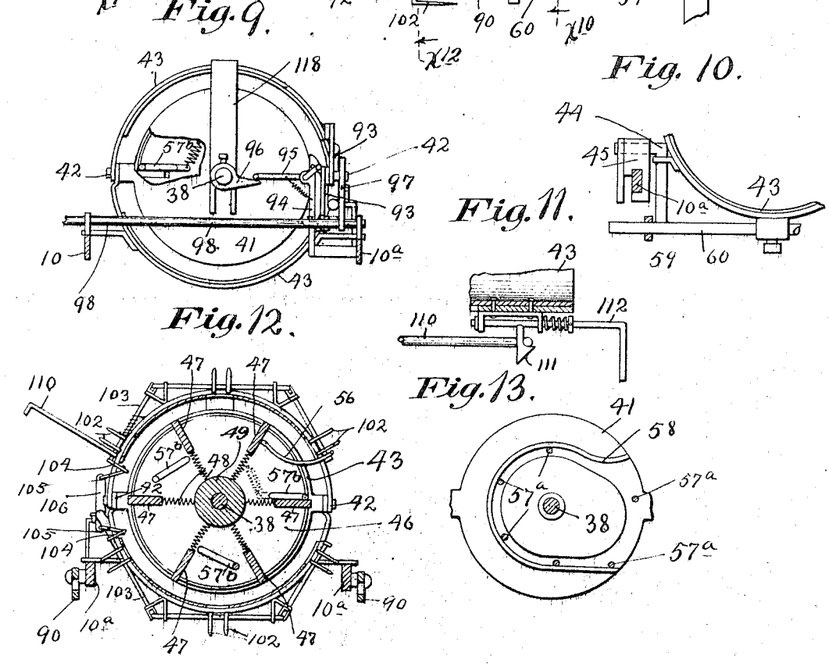
Fig. 9 is a section taken on the line $x^9$ $x^9$ on Fig. 8.
Fig. 10 is a section taken on the line $x^{10}$ $x^{10}$ on Fig. 8.
Fig. 11 is a detail in section taken on the line $x^{11}$ $x^{11}$ on Fig. 8.
Fig. 12 is a section taken on the line $x^{12}$ $x^{12}$ on Fig. 8.
Fig. 13 is an elevation showing certain parts found in the vicinity of the line marked $x^{13}$ $x^{13}$ on Fig. 8.

Working in each alternate compartment of the reel is a crank-like packer 57$^b$ in the form of a rod having a crank-like rear end that is journaled in the head 46 of the reel, and terminates in the rear side of the said reel head in crank-like arms 57$^a$, that are subject to a cam plunger 58 secured on the non-rotary bearing head 41 (see Figs. 8, 12 and 13). These crank-like packers 57$^b$ operate automatically under rotation of the reel, to press alternate bundles toward the axis of the reel, so that they will form the central portion of the shock. When the shock has been collected by the star wheel, reel and casing, the grain or head ends of the bundles will be contained within the casing and reel, while the butt ends of the grain will be held between the blades of the star wheel 40.

To discharge the shock and deposit the same on the ground, the star wheel is moved axially away from the casing and reel and out of engagement with the butt ends of the sheaves, and then the casing and reel are turned into a vertical position. The casing, as already noted, supports the reel. The said casing is turned into its upright discharging position shown in Fig. 3, preferably by the following connections: A pair of long links 59 are pivotally attached to crank arms 60 rigidly secured to and depending from the front end portion of the lower section 43 of the divided casing. The front ends of the links 59 are connected to the cranks 61 of the shaft 62, the ends of which are journaled in wheels 63, mounted to travel in a forwardly and rearwardly direction in guide ways 64 formed on the frame 10 (see particularly Figs. 1, 2 and 3). The crank shaft 62 is given a forward and rearward traveling movement through links 65 from the second crank shaft 66 journaled in the frame 10. The inner end of the traveling crank shaft 62 is connected to the outer end of a flexible longitudinally extensible shaft 67, the inner end of which is journaled to an extension 1ª of the harvester frame 1.

The numeral 68 indicates a segmental spur gear, and the numeral 69 indicates a sprocket, the former of which is fixed and the latter of which is loose on the inner end of the shaft 67. The sprocket 69 is driven from the harvester shaft 4, through a suitable sprocket and chain drive 70, 71 and 72. The sprocket 69 is adapted to be coupled to the inner end of the shaft 67, for rotation therewith, by means of a half clutch 73 (see Fig. 1), that is connected by a key, or otherwise, for rotation with the said shaft. The segmental gear 68 meshes with a spur pinion 74 journaled to a suitable bearing on the frame extension 1ª, and connected to the inner end of the crank shaft 66, by a jointed extensible shaft 75.

Figures 6, 7:
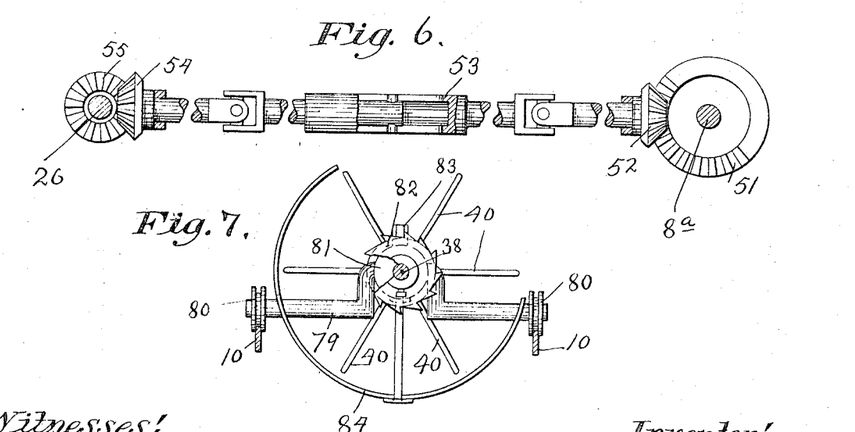
Fig. 6 is a section taken approximately on the line $x^6$ $x^6$ on Fig. 1, some parts being shown in full and some parts being broken away.
Fig. 7 is a section taken on the line $x^7$ $x^7$ on Fig. 1.

The star wheel 40 and the front end of the shaft 38 are given their endwise movements through the following connections: The numeral 76 (see Figs. 1, 2 and 3) indicates a rock shaft journaled to the frame 10 and having crank arms 77 that are connected by links 78 to the ends of a transverse axle 79 provided with flanged wheels 80 that run on the horizontal upper portions of the front end of the frame 10. The axle 79, at its intermediate portion, has a hub 81 in which the front end section of the shaft 38 is journaled. Adjacent to the hub 81, the front section of the said shaft 38 is provided with a ratchet wheel 82 that is engaged by a gravity-held dog 83 on the said hub 81. This dog and ratchet wheel permits the star wheel to be rotated with the reel but prevents backward rotation thereof. The star wheel 40 (see particularly Figs. 2 and 7) rotates within a segmental housing 84 that is supported from the axle 79 and its hub 81, and, of course, travels forwardly and rearwardly with the said star wheel, but does not rotate therewith. The inner end of the rock shaft 76 is connected by a jointed flexible shaft 85 to a spur pinion 86 journaled on the frame extension 1ª. The spur pinion 86 meshes with a spur gear 87, also journaled to the said frame extension 1ª. An operating rod 88 (see Fig. 1) is connected to the gear 87, at a point eccentric to its axis, and its rear end is connected to an oscillatory foot piece 89 mounted on the rear portion of a harvester frame 1. With this connection, when the front end of the foot piece is pressed downward, the star wheel 40 will be drawn forward, and when the rear end of the said foot piece is pressed downward the said star wheel will be forced rearward, back to normal position.

It will be remembered that the two-part casing 43 and parts mounted thereon are pivoted to bearings 45 that are mounted to slide forwardly and rearwardly on bars 10ª of the frame 10. Latch bars 90 are pivoted to these bearings and are provided with slots 91 having notched extremities that normally engage with latch pins 92 (see Fig. 8), secured on the said bars 10ª. These latch bars, therefore, normally hold the bearings 45 in their normal positions and against sliding movements. When the casing 43 and the reel therein contained are raised nearly to vertical position the projecting ends of the crank arms 60 which are secured to the lower case section 43, will engage the said latch bars and raise the same, thereby releasing the same and permitting further rearward movements of the links 59, under the action of the crank shaft 62, to move the said casing and reel rearward in respect to the frame 10 at the same rate that the machine is moving forward. This permits the shock to be properly deposited on the ground.

It may be here noted that the pivotal raising movement and the subsequent rearward movements of the casing and reel, are produced through the two jointed shafts 67 and 75, and coöperating crank shafts 62 and 66 in the following way. The crank shaft 62 is given a relatively slow speed, and approximately the first quarter movement thereof, serves to pivotally raise the said casing 43 and reel. The crank shaft 66 is intermittently moved at a high rate of speed through the segmental gear 68 and coöperating pinion 74 and the timing is such that the combined movement of the two cranks 62 and 66 will be simultaneously effective to move the said casing and reel rearward after they have been turned into a vertical position. The forward return movements of the said casing and reel will be produced by a reverse action. Normally, the upper section of the casing 43 is raised, as shown in Fig. 8, and is held in such position by the following connections: The numeral 93 indicates the toggle that connects rearwardly extended arms of the case sections 43. The numeral 94 indicates a spring latch secured at its lower end to a rear projection of bottom case section 43 and having a hook at its upper end that normally engages a projection on one of the links of the toggle 93. A spring retracted bell crank 95 is pivoted to the free end of the latch 94 and one arm thereof is in position to engage the toggle link 93, while the other arm thereof is in position to be engaged by a tappet or cam lug 96 that is carried by the rear section of the shaft 38. After the last bundle has been deposited in the casing 43 and within the reel, the tappet 96 engages the trip 95 and releases the latch 94 from the toggle 93, thereby permitting the upper case section 43 to fall into a closed position. This movement of the toggle 93 through connections, which will now be described, gives a signal to the operator on the seat 9 indicating that the shock has been accumulated and that certain other actions should follow. The connections just referred to are as follows: The numeral 97 indicates a lever secured to a rock shaft 98 journaled in suitable bearings on the frame 10 and in the rearwardly extended portion of the harvester frame 1. At its inner end, this shaft 98 is provided with an arm 99 that is connected by a link 100 to the foot piece 101 (see Figs. 1, 2, 3 and 8), which foot piece is mounted for oscillatory movements on the rear portion of the harvester frame 1, that is located adjacent to the foot piece 89. When the toggle 93 is straightened by lowering of the upper case section 43, the intermediate pivot bolt 93ᵃ of the said toggle strikes the lever 97 and oscillates the shaft 98 and the foot piece 101.

When the casing and reel are turned in an upright position, shown in Fig. 3, the bundles constituting the shock within the casing are not immediately dropped, but are temporarily held therein by a multiplicity of forks, of which there is one for each bundle in the shock. These forks (see Figs. 2, 3, 8 and 12) comprise approximately L-shaped tines 102 secured to short rock shafts 103 journaled in suitable bearings on the sections of the casing 43. The tines are adapted to work through openings in the casing and the shafts 103 that are on the same casing section are connected by knuckle joints, so that they make up, in effect, two jointed shafts extending circumferentially of the casing sections. At one end, these two jointed shafts are provided with crank arms 104 that are connected by rods 105 to a cross head 106 (see particularly Figs. 8 and 12), so that all of the forks will be simultaneously given forward movements and simultaneously given outward movements when the cross head 106 is moved forwardly or rearwardly. The forks are moved into operative positions on the bundles of the shock at the same time that the arm 97 is given its rearward oscillatory movement. This, as shown, is accomplished by a long pawl or hook nose link 107 pivoted to the said lever 97 and engageable with a projection on the said cross head (see Fig. 8). The cross head 106, as shown, is supported by a rigidly secured stem 108, that works in a tubular guide 109 rigidly secured on the lower case section 43.

The downward or closing movement of the upper case section 43 above described, which gives the signal to the operator by imparting a slight oscillation to the foot piece 101, gives an initial closing movement to the forks. This closing or inward movement of the forks, however, is completed by the operator, who, by manipulation of the foot piece 101, continues the movement in the proper direction.

When the forks are moved inward to their extreme positions, they will be locked while the casing 43 and reel are being turned upward, and will be released when the said casing and reel heads are approximately at their vertical positions. This is accomplished by devices, best shown in Figs. 3, 8 and 11, wherein the numeral 110 indicates an arm rigidly secured to one of the connected fork shafts 103. The free end of this arm 110 is bent laterally and is adapted to be engaged with a cam-nose hook 111 on a spring retracted bolt 112, mounted in suitable bearings on the upper case section 43, with its free end in position to be engaged with one of the frame bars 10, when the casing and reel are turned into their vertical positions, shown in Fig. 3. Thus, it will be seen, that when the casing is in its extreme vertical position, the hook 111 will be disengaged from the laterally turned free end of the arm 110, and the spring retracted forks will then be restored to normal position, so that the bundles constituting the shock will then be dropped onto the ground butt end downward.

Normally, as already noted, the shocks will be held both by the reel and by the star wheel 40. When the star wheel is given its forward movement, which is produced by pressure on the front end of the foot piece 89 and a resulting forward movement of the thrust rod 88, the casing and reel are moved rearward simultaneously therewith, and, as shown, this is accomplished by means of a bell crank lever 113 (see Fig. 1), which is pivoted to the frame extension 1ª, and connected to the clutch 73 and to the thrust rod 88. Thus the forward movement of the rod 88 engages the clutch 73 with the half clutch on the sprocket 69, and the two shafts 67 and 75 and crank shafts 62 and 66 will then be rotated through the sprocket and chain drive with a timed action already noted.

While the casing and reel are moved from normal position to deposit the shock of accumulated bundles, as above described, the bundle delivery arm 49ª and the feed chains 20 should be thrown out of action to thereby stop the delivery of bundles and to prevent the said arm 49ª from interfering with certain moving parts. This is accomplished automatically from movement of the rock shaft 98, which movement is produced in a manner already clearly described. Directing attention to Figs. 2 and 3, it will be noted that the rock shaft 98 has a depending arm 114 that is connected to a shipper rod 115, the front end of which is turned upward and connected to a groove in the half clutch 50 of the arm 49ª, so that the said half clutch will be thrown into its inoperative position shown in Fig. 3 whenever the arm 97 is moved rearward. The intermediate portion of the rod 115 is connected to a shipper lever 116 intermediately pivoted to a support on the frame 10 and connected at its upper end to a groove in the hub of the half clutch 29. The flexible shaft 31 drives shaft 26 continuously except when the clutch 29 is thrown out of action, as above described. The half clutch 56ª is always in engagement with the half clutch of the gear 55 but is of such construction that it will permit the shaft 26 always to be driven ahead when the shaft 31 is in action. When the shaft 31 is put out of action, as above described, while the shock is being deposited, the shaft 26, and hence, the elevator chains 20 will be given slow intermittent movements through the shaft 53, which is driven from the bundle discharge shaft of the harvester. This intermittent movement of the chains 20 will be only sufficient to properly spread out the bundles on the said chains while the shock is being deposited. Then when the shaft 31 is again thrown into action, after the casing, reel and star wheel have been restored to normal position, so as to receive the bundles, these accumulated bundles will be properly deposited by the movements then imparted to the chains 20 through the said shaft 31. Even when the shaft 26 is driven through both of the jointed shafts 31 and 53, the relatively fast intermittent movement imparted to the said shaft 26 through the shaft 53 and gears 51 and 52, will insure proper positioning of the teeth or forks of the chains 20, to receive between them the bundles discharged in succession from the binder.

The bundle delivery arm 49ª is always connected to the adjacent sprocket 22 while bundles are being delivered to the casing of the shock former. This arm, as above indicated, packs the bundles in succession in compartments of the shock former, and by the packing action positively imparts a step by step rotary movement to the reel and to the star wheel, or, in other words, to the two sections of the divided reel. There will be sufficient space between the bundles of the elevator chains, so that the one bundle will not be delivered to the shock former until the preceding bundle has been properly placed by the arm 49ª.

By reference particularly to Fig. 3, it will be noted, that the trunnions 60 on the front of the lower case section 43 move on rigid guide rails 117, after the casing has been turned into a vertical position and while the casing is moving rearward on the frame 10. By reference to Figs. 3, 8 and 9, it will be noted that the upper case section 43 is provided on its rear with a depending stop 118, the bifurcated lower end of which engages the front section of the shaft 38 and presses the core 48 down to proper position when the casing 43 is in position to receive bundles, as shown in Fig. 8.

The drawings of this application show a machine designed for left hand cutting, but it will, of course, be understood that it may be arranged for right hand cutting.

For convenience, in the foregoing specification, one element has been called a "reel" and another a "star wheel", but as a matter of fact, both are properly reels and the two make up a two-part reel, one section of which is movable toward and from the other.

What I claim is:

1. A shocker comprising a reel normally disposed with its axis in an approximately horizontal position and rotatably movable to accumulate the bundles therein, a cylindrical casing surrounding said reel and having a lateral opening for receiving the bundles, and means for turning the said reel into an approximately upright position to discharge the accumulated shock therefrom.

2. A shocker comprising a casing having a lateral opening for receiving the bundles, a reel normally disposed with its axis in an approximately horizontal position, and working in said casing, rotatably movable to accumulate a shock of bundles within said casing, and means for moving said casing and reel into an upright position to discharge the accumulated shock.

3. In a shocker, the combination with a truck, of an approximately horizontal casing carried by said truck and having a lateral opening for receiving the bundles, a reel having a horizontal axis working in said casing, rotatably movable to accumulate a shock of bundles within said casing, and means for moving said casing and reel into an upright position to discharge the shock of accumulated bundles therefrom.

4. In a shocker, the combination with a truck, of an approximately horizontal casing carried by said truck and having a lateral opening for receiving the bundles, a reel having a horizontal axis and working in said casing, rotatably movable to accumulate a shock of bundles within said casing, and means for moving said casing and reel into an upright position to discharge the shock of accumulated bundles therefrom, the said casing and reel having a rearward movement in respect to said truck in the shock discharging action.

5. In a shocker, the combination with a truck, of an approximately horizontal casing carried by said truck and having a lateral opening for receiving the bundles, a reel having a horizontal axis and working in said casing, rotatably movable to accumulate a shock of bundles within said casing, means for moving said casing and reel into an upright position to discharge the shock of accumulated bundles therefrom, forks applied to said casing and engageable with the bundles contained therein to prevent premature discharge thereof, means for causing said forks to engage the bundles as the said casing and reel are moved to an upright position, and means for operating said forks to release the bundles while said casing and reel are in an upright position.

6. In a shocker, the combination with a truck, of an approximately horizontal casing carried by said truck and having a lateral opening for receiving the bundles, a reel having a horizontal axis and working in said casing, rotatably movable to accumulate a shock of bundles within said casing, means for moving said casing and reel into an upright position to discharge the shock of accumulated bundles therefrom, forks applied to said casing and engageable with the bundles contained therein to prevent premature discharge thereof, means for causing said forks to engage the bundles as the said casing and reel are moved to an upright position, and means for operating said forks to release the bundles while said casing and reel are in an upright position, the said casing and reel having a rearward movement in respect to said truck in the shock discharging action.

7. In a shocker, the combination with a truck, of an approximately horizontal casing carried by said truck and having a lateral opening for receiving the bundles, a reel having a horizontal axis and working in said casing, rotatably movable to accumulate a shock of bundles within said casing, and means for moving said casing and reel into an upright position to discharge the shock of accumulated bundles therefrom, and an endless bundle conveyer delivering the bundles to said casing and reel.

8. In a shocker, the combination with a truck, of an approximately horizontal casing having an opening in one side to receive bundles, a reel in said casing rotatably movable to accumulate a shock of bundles within said casing, means for moving said casing and reel into an upright position to discharge the shock of accumulated bundles therefrom, an endless bundle conveyer delivering the bundles to said casing and reel, and means for driving said conveyer at two different speeds, whereby at low speed bundles will accumulate on said conveyer and under high speed bundles will be delivered to said casing.

9. A shocker comprising a two-part reel normally disposed with its axis in an approximately horizontal position, means for delivering bundles to said reel means for moving the said reel sections axially toward and from each other, and means for turning one of the reel sections into an upright position to discharge the shock of accumulated bundles.

10. In a shocker, the combination with a truck, of a two-part reel normally disposed with its axis in an approximately horizontal position, means for rotating said reel, a casing inclosing one of the reel sections and having an opening in one side to receive the bundles, a divided casing surrounding the other reel section, said divided casing and the reel section inclosed therein being movable from a horizontal position into an upright position to discharge the accumulated shock, a bundle conveyer for delivering bundles to said reel and casings, and means for driving said conveyer at two different speeds, whereby at low speed bundles will accumulate on said conveyer and at high speed bundles will be delivered to said reel and casings.

11. In a shocker, the combination with a truck, of a two-part reel normally disposed with its axis in an approximately horizontal position, means for rotating said reel, a casing inclosing one of the reel sections and having an opening in one side to receive the bundles, a divided casing surrounding the other reel section, said divided casing and the reel section inclosed therein being movable from a horizontal position into an upright position to discharge the accumulated shock, forks applied to said divided casing to prevent premature discharge of bundles therefrom, means for operating said forks, a bundle conveyer for delivering bundles to said reel and casings, and means for driving said conveyer at two different speeds, whereby at low speed bundles will accumulate on said conveyer and at high speed bundles will be delivered to said reel and casings.

12. In a shocker, the combination with a truck, of a two-part reel normally disposed with its axis in an approximately horizontal position, means for rotating said reel, a casing inclosing one of the reel sections and having an opening in one side to receive the bundles, a divided casing surrounding the other reel section, said divided casing and the reel section inclosed therein being movable from a horizontal position into an upright position to discharge the accumulated shock, forks applied to said divided casing to prevent premature discharge of bundles therefrom, means for operating said forks, a bundle conveyer for delivering bundles to said reel and casings, means for driving said conveyer at two different speeds, whereby at low speed bundles will accumulate on said conveyer and at high speed bundles will be delivered to said reel casing, and means for holding said divided casing and the reel section therein contained approximately stationary while in an upright position and while the shock is being discharged therefrom.

13. In a shocker, the combination with a truck of a two-part reel mounted on said truck for forward and rearward movements, one part in respect to the other, and one section thereof being movable into an upright position to discharge the shock of bundles accumulated therein.

14. In a shocker, the combination with a truck, a two-part reel mounted on said truck for forward and rearward movements, one part in respect to the other, and one section thereof being movable into an upright position to discharge the shock of bundles accumulated therein, a two-part casing including that part of the reel which is movable into an upright position, and means for causing said casing and the reel therein to occupy an approximately local position in the shock discharging action while said truck moves forward.

15. In a shocker, the combination with a truck, of a two-part reel mounted on said truck for forward and rearward movements, one part in respect to the other, and one section thereof being movable into an upright position to discharge the shock of bundles accumulated therein, a two-part casing inclosing and movable with the reel section of said reel, means for moving the front reel section forward to disengage the same from the bundles of the accumulated shock, and means for turning the rear reel section and casing into an upright position and for holding the same in a local position while said truck moves forward.

16. In a shocker, the combination with a truck, of a two-part reel mounted on said truck for forward and rearward movements, one part in respect to the other, and one section thereof being movable into an upright position to discharge the shock of bundles accumulated therein, a two-part casing inclosing and movable with the reel section of said reel, means for moving the front reel section forward to disengage the same from the bundles of the accumulated shock, means for turning the rear reel section and casing into an upright position and for holding the same in a local position while said truck moves forward, an automatic lock for holding said rear reel section and casing against sliding movements on the said truck while it is being turned into an upright position, and means for releasing said lock and permitting the upright reel and casing to move rearward on said truck while depositing the shock on the ground.

17. A shocker comprising a reel normally disposed with its axis in an approximately horizontal position and rotatably movable to accumulate the bundles therein, a cylindrical casing surrounding said reel and having a lateral opening for receiving the bundles, means for turning the said reel into an approximately upright position to discharge the accumulated shock therefrom, and means for moving said reel by step-by-step movement.

18. In a shocker, the combination with a truck, of an approximately horizontal casing, carried by said truck and having a lateral opening for receiving bundles, a reel having a horizontal axis and working in said casing, rotatably movable to accumulate a shock of bundles within said casing, means for moving said casing and reel into an upright position to discharge the shock of accumulated bundles therefrom, forks engageable with the bundles contained within said casing to prevent premature discharge thereof, means for causing said forks to engage the bundles as the said casing and reel are moved to an upright position, and means for operating said forks to release the bundles while said casing and reel are in an upright position.

19. In a shocker, the combination with a rotary reel having compartments and means for delivering bundles to the compartments of said reel, of automatically actuated means operative to press bundles in the alternate compartments toward the axis of the reel, so that they will form the central portion of the shock.

20. In a shocker, the combination with a reel arranged to rotate on an approximately horizontal axis while receiving bundles and movable into an upright position to discharge the bundles, of automatically actuated packers in the alternate compartments of said reel operative to press the bundles in alternate compartments of said reel toward the axis thereof, so that they will form the central portion of the shock.

21. In a shocker, the combination with a truck, of a bundle receiving reel arranged to rotate on an approximately horizontal axis to receive the bundles, and movable into an upright position to discharge the bundles, of crank-like packers in alternate compartments of said reel operative under rotation of the drum to automatically form the bundles in alternate compartments toward the axis thereof, so that they will form the central portion of the shock.

22. In a shocker, the combination with a truck, of a rotary reel, means for rotating said reel on an approximately horizontal axis to receive the bundles, and means for moving said reel into an upright position to discharge the bundles, of crank-like packers in the alternate compartments of said reel and a horizontally fixed abutment operative on said cranks in succession under rotation of the drum to force the bundles in alternate compartments of said reel toward the axis thereof, so that they will form the central portion of the shock.

In testimony whereof I affix my signature in presence of two witnesses.

KARL A. JOHNSON.

Witnesses:
HARRY D. KILGORE,
F. D. MERCHANT.